US012714154B2

(12) United States Patent
Kim et al.

(10) Patent No.: US 12,714,154 B2
(45) Date of Patent: Aug. 25, 2026

(54) AEROSOL GENERATING DEVICE AND AEROSOL GENERATING SYSTEM FOR RECOMMENDING REPLACEABLE CARTRIDGE

(71) Applicant: KT&G CORPORATION, Daejeon (KR)

(72) Inventors: Jeong Hoo Kim, Chungcheongbuk-do (KR); Woo Seok Chung, Gyeonggi-do (KR)

(73) Assignee: KT&G CORPORATION, Daejeon (KR)

(*) Notice: Subject to any disclaimer, the term of this patent is extended or adjusted under 35 U.S.C. 154(b) by 1199 days.

(21) Appl. No.: 17/625,571

(22) PCT Filed: Oct. 8, 2020

(86) PCT No.: PCT/KR2020/013784
§ 371 (c)(1),
(2) Date: Jan. 7, 2022

(87) PCT Pub. No.: WO2021/071305
PCT Pub. Date: Apr. 15, 2021

(65) Prior Publication Data

US 2022/0287378 A1 Sep. 15, 2022

(30) Foreign Application Priority Data

Oct. 11, 2019 (KR) ........................ 10-2019-0126295

(51) Int. Cl.
*A24F 40/60* (2020.01)
*G06N 3/02* (2006.01)
(Continued)

(52) U.S. Cl.
CPC ............... *A24F 40/60* (2020.01); *G06N 3/02* (2013.01); *G06Q 30/0631* (2013.01); *A24F 40/10* (2020.01)

(58) Field of Classification Search
CPC .......... A24F 40/60; A24F 40/10; A24F 40/42; A24F 40/65; A24F 40/50; G06N 3/02;
(Continued)

(56) References Cited

U.S. PATENT DOCUMENTS 7,751,285 B1 * 7/2010 Cain .................... G04G 9/0017 368/10
9,600,581 B2 * 3/2017 Chu .................... G06F 16/9535
(Continued)

FOREIGN PATENT DOCUMENTS

CN 105942583 A 9/2016
CN 107411174 A 12/2017
(Continued)

OTHER PUBLICATIONS

Office Action dated Apr. 17, 2023 from the Chinese Patent Office in Application No. 202080060519.2.
(Continued)

*Primary Examiner* — Peter S Vasat
*Assistant Examiner* — Stephen Alvesteffer
(74) *Attorney, Agent, or Firm* — Sughrue Mion, PLLC

(57) ABSTRACT

An aerosol generating device includes: an output unit; a biometric information obtaining unit configured to obtain an image of a pupil of a user; a communication unit configured to transmit the image of the pupil of the user to a server and receive information about a recommended cartridge corresponding to the emotional state calculated by the server using a neural-network-based emotion calculation model and a neural-network-based cartridge recommendation
(Continued)

model; and a controller configured to control the output unit to output the recommendation cartridge information.

11 Claims, 9 Drawing Sheets

(51) Int. Cl.
*G06Q 30/0601* (2023.01)
*A24F 40/10* (2020.01)

(58) Field of Classification Search
CPC ........ G06N 3/044; G06N 3/045; G06N 20/00; G06Q 30/0631; G06Q 50/10; A61M 11/042; A61M 2205/0211; A61M 2205/3592; A61M 2205/6072; A61M 2205/609; A61M 2230/04; A61M 15/06; A61M 2230/08; A61M 2230/40; A61M 2230/42; A61M 2230/50; G06V 40/18; G16H 40/63
USPC .......................................................... 434/236
See application file for complete search history.

(56) References Cited

U.S. PATENT DOCUMENTS

2013/0340775 A1 12/2013 Juster et al.
2015/0245666 A1 9/2015 Memari et al.
2016/0337444 A1* 11/2016 Cameron ................ H04L 67/10
2016/0338407 A1* 11/2016 Kerdemelidis ......... A24F 40/60
2018/0043114 A1* 2/2018 Bowen .................... A24F 40/65
2018/0338532 A1 11/2018 Verleur et al.
2019/0139440 A1 5/2019 Saito
2019/0167927 A1 6/2019 Dagnello et al.
2020/0338282 A1* 10/2020 Trzecieski .............. A24F 40/53
2021/0103426 A1* 4/2021 Heo ........................ G06F 1/163

FOREIGN PATENT DOCUMENTS

CN 109376304 A 2/2019
JP 2019-067447 A 4/2019
KR 10-2016-0009678 A 1/2016
KR 10-2016-0129024 A 11/2016
KR 10-2018-0086738 A 8/2018
KR 10-2019-0011264 A 2/2019

OTHER PUBLICATIONS

Office Action issued from Korean Patent Application No. 10-2019-0126295 issued on Apr. 27, 2021.
International Search Report for PCT/KR2020/013784 dated Apr. 7, 2021 (PCT/ISA/210).
Written Opinion for PCT/KR2020/013784 dated Apr. 7, 2021 (PCT/ISA/237).

* cited by examiner

AEROSOL GENERATING DEVICE AND AEROSOL GENERATING SYSTEM FOR RECOMMENDING REPLACEABLE CARTRIDGE

CROSS REFERENCE TO RELATED APPLICATIONS

This application is a National Stage of International Application No. PCT/KR2020/013784 filed Oct. 8, 2020, claiming priority based on Korean Patent Application No. 10-2019-0126295 filed Oct. 11, 2019.

TECHNICAL FIELD

The present disclosure relates to an aerosol generating device and an aerosol generating system configured to recommend a replaceable cartridge, and more particularly, to an aerosol generating device and an aerosol generating system capable of recommending cartridges based on emotional states of a user.

BACKGROUND ART

Recently, the demand for alternative to traditional cigarettes has increased. For example, there is growing demand for an aerosol generating device that generates aerosols by heating an aerosol generating material in cigarettes or liquid storages rather than by combusting cigarettes.

An aerosol generating device may include a cartridge accommodating an aerosol generating material. The cartridges are designed to be replaceable, but the cartridges are merely selected according to a user's preference. There is a need for a mechanism for recommending cartridges based on the user's emotional states.

DISCLOSURE OF INVENTION

Technical Problem

The present disclosure is to provide an aerosol generating device and an aerosol generating system capable of identifying emotional states of a user and recommending cartridges corresponding to the emotional states.

Technical goals of the present disclosure are not limited to the description, and other technical goals may be derived from the following examples.

Solution to Problem

An aerosol generating device includes: an output unit; a biometric information obtaining unit configured to obtain an image of a pupil of a user; a communication unit configured to transmit the image of the pupil of the user to a server and receive information about a recommended cartridge corresponding to an emotional state of the user from the server; and a controller configured to control the output unit to output the information about the recommended cartridge, wherein the emotional state of the user is calculated by the server using a neural-network-based emotion calculation model based on the image, and the information about the recommended cartridge is calculated by the server using a neural-network-based cartridge recommendation model based on the emotional state of the user.

Advantageous Effects of Invention

An aerosol generating device and an aerosol generating system of the present disclosure improve user satisfaction by recommending cartridges corresponding to emotional states of the user.

In addition, the emotion calculation model in the aerosol generating device and the aerosol generating system are machine-learned based on an image of a pupil of the user, and therefore, it is possible to calculate the emotional states in a user-customized manner.

In addition, the cartridge recommendation model in the aerosol generating device and the aerosol generating system is updated based on information about a replacement cartridge installed by a user, and therefore, it is possible to provide a customized cartridge recommendation.

BEST MODE FOR CARRYING OUT THE INVENTION

Figure 1:
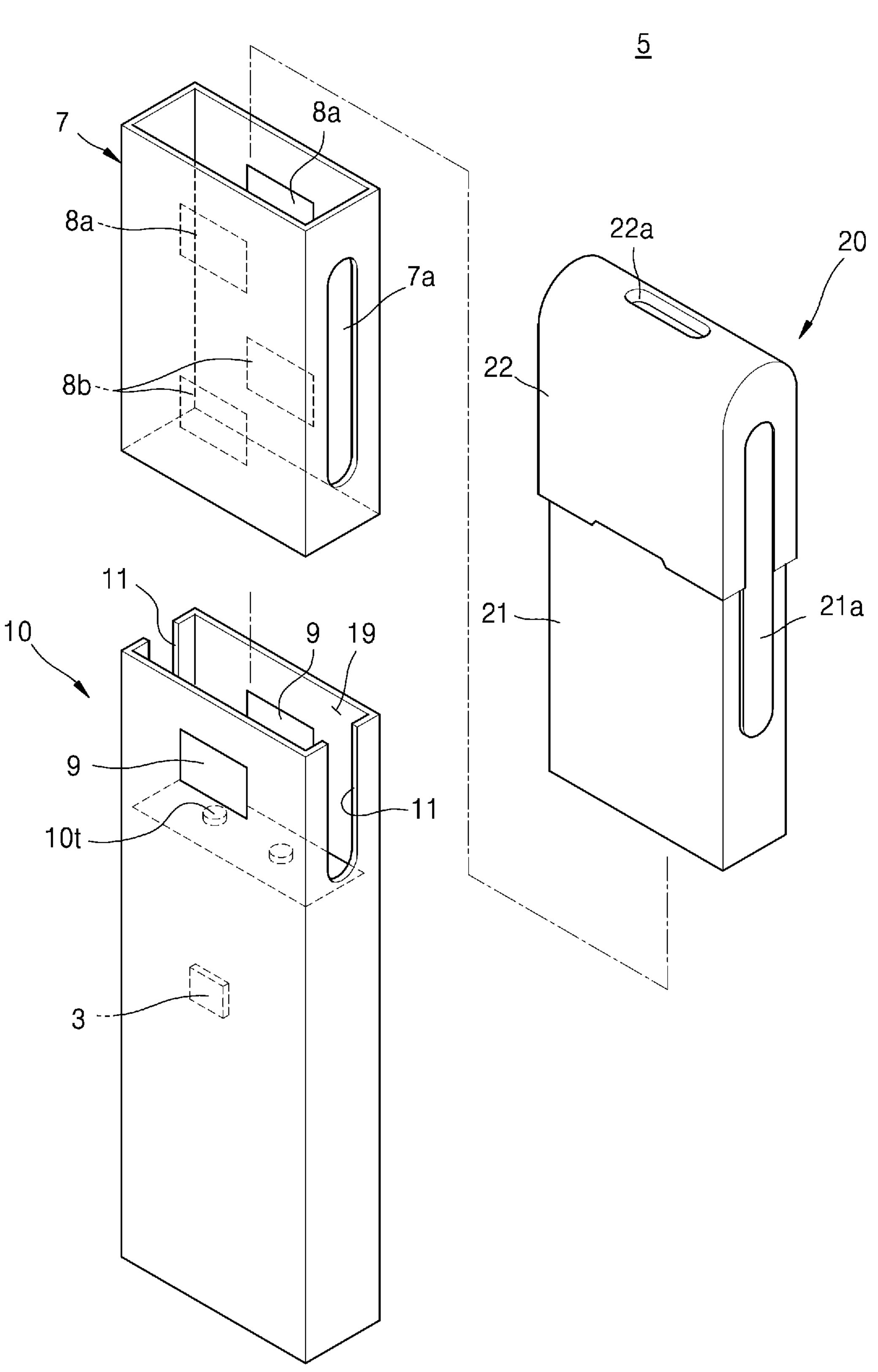
FIG. 1 is an exploded perspective view schematically illustrating a coupling relationship between a replaceable cartridge containing an aerosol generating material and an aerosol generating device including the same, according to an embodiment.

An aerosol generating device according to an aspect includes: an output unit; a biometric information obtaining unit configured to obtain an image of a pupil of a user; a communication unit configured to transmit the image of the pupil of the user to a server and receive information about a recommended cartridge corresponding to an emotional state of the user from the server; and a controller configured to control the output unit to output the information about the recommended cartridge, wherein the emotional state of the user is calculated by the server using a neural-network-based emotion calculation model based on the image, and the information about the recommended cartridge is calculated by the server using a neural-network-based cartridge recommendation model based on the emotional state of the user.

In addition, the aerosol generating system further includes a user interface configured to receive input information about the emotional state of the user, wherein the controller is configured to, during a preset learning period, transmit the input information and the image of the pupil of the user to the server via the communication unit, and wherein the image of the pupil of the user is obtained by the biometric information obtaining unit at a time point when the input information is received.

Also, the emotion calculation model is generated through machine learning based on the emotional states and the images of the pupil collected during the learning period.

Also, the cartridge recommendation model recommends cartridges having different component ratios of liquid compositions based on the emotional state of the user.

In addition, the aerosol generating device further includes a cartridge identification unit configured to identify a type of the cartridge coupled to the main body, wherein the controller is configured to, transmit information about a replacement cartridge, which is newly installed after the information about the recommended cartridge is output, to the server via the communication unit, the information about the replacement cartridge being identified by the cartridge identification unit.

Also, the cartridge recommendation model is updated based on the replacement cartridge information.

In addition, the cartridge recommendation model is updated by a Bayesian optimization algorithm.

In addition, the communication unit receives information about the emotional state of the user from the server, and the output unit outputs an audio message corresponding to the information about the emotional state of the user.

An aerosol generating system according to another aspect includes: an aerosol generating device including a replaceable cartridge containing an aerosol generating material, and configured to obtain an image of a pupil of a user and output information about a recommended cartridge; and a server configured to: receive the image of the pupil of the server from the aerosol generating device; calculate an emotional state of the user based on the image of the pupil by using a neural-network-based emotion calculation model; calculate the recommended cartridge based on the emotional state of the user by using a neural-network-based cartridge recommendation model; and transmit information about the recommended cartridge to the aerosol generating device.

In addition, the aerosol generating device, during the preset learning period, transmits the input information about the emotional state and the pupil image of the user that is obtained at a time point when the input information is received.

Also, the server generates the emotion calculation model through machine learning based on the input information about the emotional state and images of the pupil collected during the learning period.

Also, the cartridge recommendation model recommends cartridges having different component ratios of liquid compositions based on the emotional states of the user.

In addition, the aerosol generating device transmits information about the identified replacement cartridge, which is newly installed after the information about the recommended cartridge is output, to the server.

In addition, the server updates the cartridge recommendation model based on the information about the replacement cartridge.

Also, the server updates the cartridge recommendation model by using a Bayesian optimization.

In addition, the aerosol generating device outputs an audio message corresponding to the information about the emotional state of the user.

MODE FOR THE INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is an exploded perspective view schematically illustrating a coupling relationship between a replaceable cartridge containing an aerosol generating material and an aerosol generating device including the same, according to an embodiment.

An aerosol generating device 5 according to the embodiment illustrated in FIG. 1 includes the cartridge 20 containing the aerosol generating material and a main body 10 supporting the cartridge 20.

The cartridge 20 may be coupled to the main body 10 in a state in which the aerosol generating material is accommodated therein. A portion of the cartridge 20 is inserted into an accommodation space 19 of the main body 10 so that the cartridge 20 may be mounted on the main body 10.

The cartridge 20 may contain an aerosol generating material in any one of, for example, a liquid state, a solid state, a gaseous state, or a gel state. The aerosol generating material may include a liquid composition. For example, the liquid composition may be a liquid including a tobacco-containing material having a volatile tobacco flavor component, or a liquid including a non-tobacco material.

For example, the liquid composition may include one component of water, solvents, ethanol, plant extracts, spices, flavorings, and vitamin mixtures, or a mixture of these components. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for the formation of the nicotine salts may be appropriately selected in consideration of the rate of nicotine absorption in the blood, the operating temperature of the aerosol generating device 5, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The cartridge 20 is operated by an electrical signal or a wireless signal transmitted from the main body 10 to perform a function of generating aerosol by converting the phase of the aerosol generating material inside the cartridge 20 to a gaseous phase. The aerosol may refer to a gas in which vaporized particles generated from an aerosol generating material are mixed with air.

For example, the cartridge 20 may convert the phase of the aerosol generating material by receiving the electrical signal from the main body 10 and heating the aerosol generating material, or by using an ultrasonic vibration method, or by using an induction heating method. As another example, when the cartridge 20 includes its own power source, the cartridge 20 may generate aerosol by being operated by an electric control signal or a wireless signal transmitted from the main body 10 to the cartridge 20.

The cartridge 20 may include a liquid storage 21 accommodating the aerosol generating material therein, and an atomizer performing a function of converting the aerosol generating material of the liquid storage 21 to aerosol.

When the liquid storage 21 "accommodates the aerosol generating material" therein, it means that the liquid storage 21 functions as a container simply holding an aerosol generating material and that the liquid storage 21 includes therein an element impregnated with (containing) an aerosol generating material, such as a sponge, cotton, fabric, or porous ceramic structure.

The atomizer may include, for example, a liquid delivery element (wick) for absorbing the aerosol generating material and maintaining the same in an optimal state for conversion to aerosol, and a heater heating the liquid delivery element to generate aerosol.

The liquid delivery element may include at least one of, for example, a cotton fiber, a ceramic fiber, a glass fiber, and porous ceramic.

The heater may include a metallic material such as copper, nickel, tungsten, or the like to heat the aerosol generating material delivered to the liquid delivery element by generating heat using electrical resistance. The heater may be implemented by, for example, a metal wire, a metal plate, a ceramic heating element, or the like, and may be implemented by a conductive filament, wound on the liquid delivery element, or arranged adjacent to the liquid delivery element, by using a material such as a nichrome wire.

In addition, the atomizer may be implemented by a heating element in the form of a mesh or plate, which performs both the functions of absorbing the aerosol generating material and maintaining the same in an optimal state for conversion to aerosol without using a separate liquid delivery element and the function of generating aerosol by heating the aerosol generating material.

At least a portion of the liquid storage 21 of the cartridge 20 may include a transparent material so that the aerosol generating material accommodated in the cartridge 20 may be visually identified from the outside. The liquid storage 21 includes a protruding window 21*a* protruding from the liquid storage 21, so that the liquid storage 21 may be inserted into a groove 11 of the main body 10 when coupled to the main body 10. A mouthpiece 22 and the liquid storage 21 may be entirely formed of transparent plastic or glass, and only the protruding window 21*a* corresponding to a portion of the liquid storage 21 may be formed of a transparent material.

The main body 10 includes a connection terminal 10*t* arranged inside the accommodation space 19. When the liquid storage 21 of the cartridge 20 is inserted into the accommodation space 19 of the main body 10, the main body 10 may provide power to the cartridge 20 through the connection terminal 10*t* or supply a signal related to an operation of the cartridge 20 to the cartridge 20.

The mouthpiece 22 is coupled to one end of the liquid storage 21 of the cartridge 20. The mouthpiece 22 is a portion of the aerosol generating device 5, which is to be inserted into a user's mouth. The mouthpiece 22 includes a discharge hole 22*a* for discharging aerosol generated from the aerosol generating material inside the liquid storage 21 to the outside.

The slider 7 is coupled to the main body 10 to move with respect to the main body 10. The slider 7 covers at least a portion of the mouthpiece 22 of the cartridge 20 coupled to the main body 10 or exposes at least a portion of the mouthpiece 22 to the outside by moving with respect to the main body 10. The slider 7 includes an elongated hole 7*a* exposing at least a portion of the protruding window 21*a* of the cartridge 20 to the outside.

The slider 7 has a container shape with a hollow space therein and both ends opened. The structure of the slider 7 is not limited to the container shape as shown in the drawing, and the slider 7 may have a bent plate structure having a clip-shaped cross-section, which is movable with respect to the main body 10 while being coupled to an edge of the main body 10, or a structure having a curved semi-cylindrical shape and a curved arc-shaped cross section.

The slider 7 includes a magnetic body for maintaining the position of the slider 7 with respect to the main body 10 and the cartridge 20. The magnetic body may include a permanent magnet or a material such as iron, nickel, cobalt, or an alloy thereof.

The magnetic body includes two first magnetic bodies 8*a* facing each other with an inner space of the slider 7 therebetween, and two second magnetic bodies 8*b* facing each other with the inner space of the slider 7 therebetween. The first magnetic bodies 8*a* and the second magnetic bodies 8*b* are arranged to be spaced apart from each other along a longitudinal direction of the main body 10, which is a moving direction of the slider 7, that is, the direction in which the main body 10 extends.

The main body 10 includes a fixed magnetic body 9 arranged on a path along which the first magnetic bodies 8*a* and the second magnetic bodies 8*b* of the slider 7 move while the slider 7 moves with respect to the main body 10. Two fixed magnetic bodies 9 of the main body 10 may be mounted to face each other with the accommodation space 19 therebetween.

Depending on the position of the slider 7, the slider 7 may be stably maintained in a position where an end of the mouthpiece 22 is covered or exposed by a magnetic force acting between the fixed magnetic body 9 and the first magnetic body 8*a* or between the fixed magnetic body 9 and the second magnetic body 8*b*.

The main body 10 includes a position change detecting sensor 3 arranged on the path along which the first magnetic body 8*a* and the second magnetic body 8*b* of the slider 7 move while the slider 7 moves with respect to the main body 10. The position change detecting sensor 3 may include, for example, a Hall IC using the Hall effect that detects a change in a magnetic field and generates a signal.

In the aerosol generating device 5 according to the above-described embodiments, the main body 10, the cartridge 20, and the slider 7 have approximately rectangular cross-sectional shapes in a direction transverse to the longitudinal direction, but in the embodiments, the shape of the aerosol generating device 5 is not limited. The aerosol generating device 5 may have, for example, a cross-sectional shape of a circle, an ellipse, a square, or various polygonal shapes. In addition, the aerosol generating device 5 is not necessarily limited to a structure that extends linearly when extending in the longitudinal direction, and may extend a long way while being curved in a streamlined shape or bent at a preset angle in a specific area to be easily held by the user.

Figure 2:
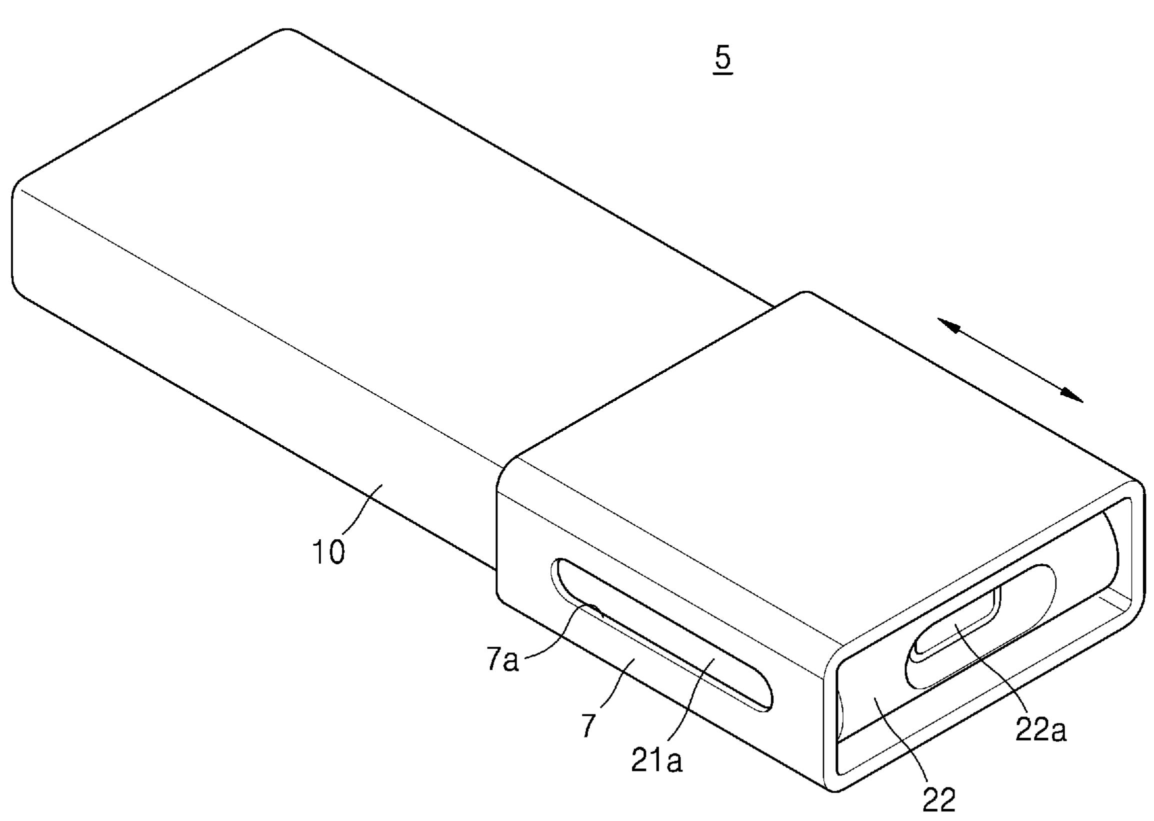
FIG. 2 is a perspective view of an example operation state of the aerosol generating device according to the embodiment illustrated in FIG. 1.

FIG. 2 is a perspective view of an exemplary operating state of the aerosol generating device according to the embodiment illustrated in FIG. 1.

In FIG. 2, the operating state is shown in which the slider 7 is moved to a position where the end of the mouthpiece 22 of the cartridge coupled to the main body 10 is covered. In a state where the slider 7 is moved to the position where the end of the mouthpiece 22 is covered, the mouthpiece 22 may be safely protected from external impurities and kept clean.

The user may check the remaining amount of aerosol generating material contained in the cartridge by visually checking the protruding window 21*a* of the cartridge through the elongated hole 7*a* of the slider 7. The user may move the slider 7 in the longitudinal direction of the main body 10 to use the aerosol generating device 5.

Figure 3:
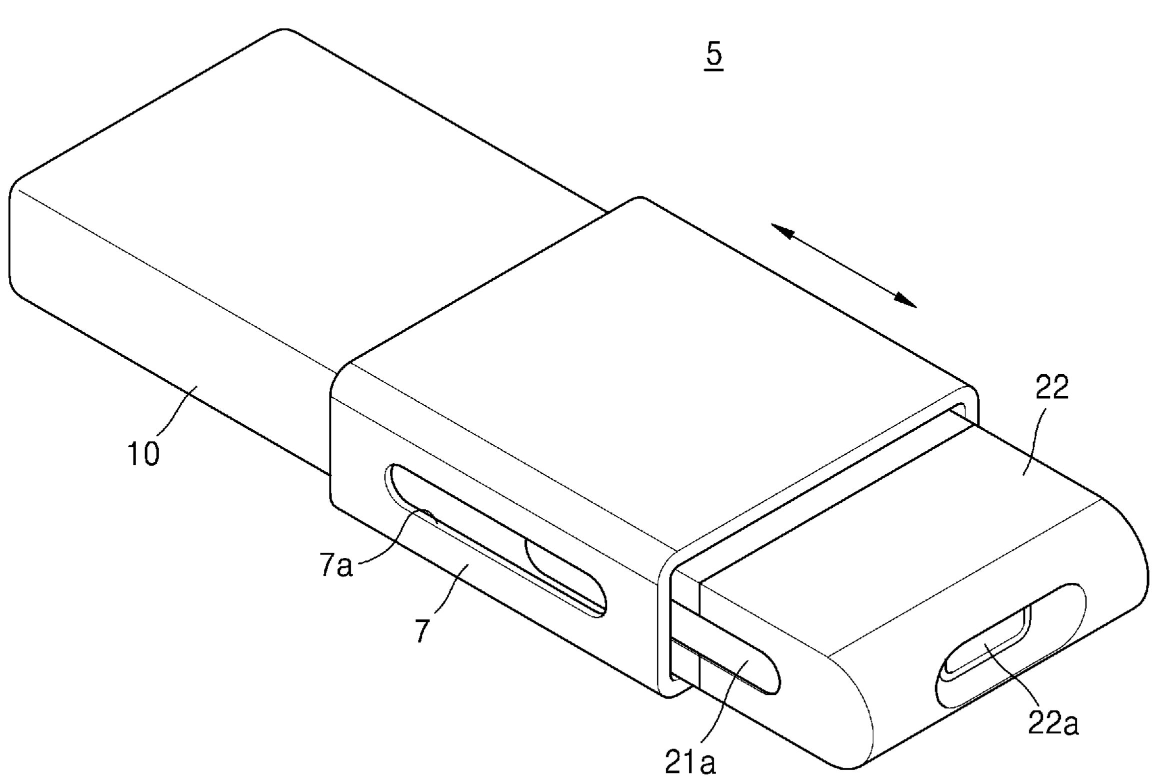
FIG. 3 is a perspective view of another example of an operating state of the aerosol generating device according to the embodiment illustrated in FIG. 1.

FIG. 3 is a perspective view of another exemplary operating state of the aerosol generating device according to the embodiment illustrated in FIG. 1.

In FIG. 3, the operating state is shown in which the slider 7 is moved to a position where the end of the mouthpiece 22 of the cartridge coupled to the main body 10 is exposed to the outside. In a state where the slider 7 is moved to the position where the end of the mouthpiece 22 is exposed to the outside, the user may insert the mouthpiece 22 into his or her mouth and absorb aerosol discharged through the discharge hole 22*a* of the mouthpiece 22.

Even when the slider 7 is moved to the position where the end of the mouthpiece 22 is exposed to the outside, the protruding window 21*a* of the cartridge is exposed to the outside through the elongated hole 7*a* of the slider 7, and thus, the user may visually check the remaining amount of aerosol generating material contained in the cartridge.

Figure 4:
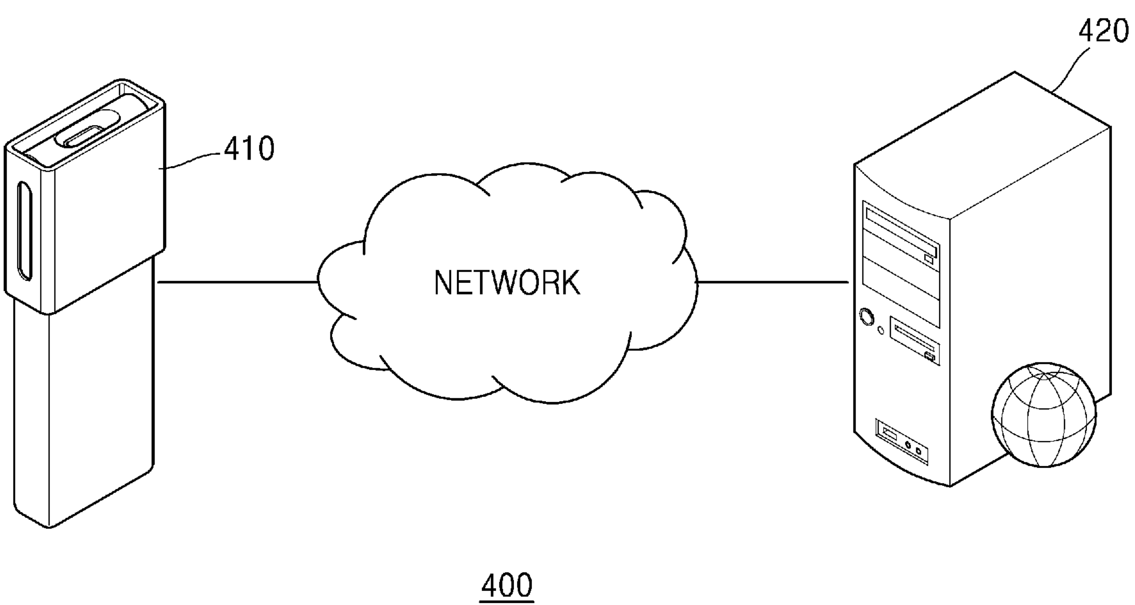
FIG. 4 is a block diagram of an aerosol generating system according to an embodiment.

FIG. 4 is a block diagram of an aerosol generating system according to the present disclosure.

Referring to FIG. 4, an aerosol generating system 400 may include an aerosol generating device 410 and a server 420.

The aerosol generating device 410 shown in FIG. 4 may correspond to the aerosol generating device 5 shown in FIGS. 1 through 3. According to embodiments, the aerosol generating device 410 of FIG. 4 may correspond to a cigarette-heating type aerosol generating device. Accordingly, the following descriptions may also be applied to a cigarette-heating type aerosol generating device. In other words, the server 420 may recommend a cigarette corresponding to an emotional state of a user, and the aerosol generating device 410 may output information about the recommended cigarette.

The aerosol generating device 410 may include a main body and a cartridge that is coupled to the main body in a replaceable manner. The cartridge may accommodate a liquid composition, and according to composition ratios of the liquid composition, difference may occur in an amount, flavor, taste, and the like of smoke, when the cartridge is heated. To satisfy diverse preferences of users, various types of cartridges may be manufactured according to different component ratios of the liquid composition and sold.

The aerosol generating device 410 may receive information about emotional states of the user and output information about a recommended cartridge corresponding to the emotional state of the user.

Specifically, the aerosol generating device 410 may obtain biometric information of the user. For example, the aerosol generating device 410 may obtain an image of a pupil of the user. As another example, the aerosol generating device 410 may obtain information about at least one of a blood pressure, a pulse, a body temperature, an electrocardiogram, respiration, and a heart rate of the user.

The aerosol generating device 410 may transmit the biometric information of the user to the server 420 through a wired or wireless network.

The server 420 may calculate the emotional state of the user corresponding to the biometric information by using a neural-network-based emotion calculation model. In addition, the server 420 may generate information about a recommended cartridge corresponding to the emotional state of the user by using a neural-network-based cartridge recommendation model.

The recommended cartridge may indicate a cartridge including a liquid composition capable of improving a negative emotional state of the user. Alternatively, the recommended cartridge may indicate a cartridge including a liquid composition capable of enhancing a positive emotional state of the user.

For example, the server 420 may output first cartridge information based on a first emotional state. For example, the first emotional state may be a negative emotional state such as a depression state, and the first cartridge information may be information about a cartridge including a vitamin D component capable of improving the depression state of the user. In addition, the server 420 may output second cartridge information based on a second emotional state. For example, the second emotional state may be a positive emotional state as a happiness state, and the second cartridge information may be information about a cartridge that includes a menthol component capable of further enhancing the happiness state of the user.

The server 420 may transmit the information about the recommended cartridge to the aerosol generating device 410 through a wired or wireless network.

The aerosol generating device 410 may output the information about the recommended cartridge received from the server 420 so that a user may change a cartridge according to the recommendation.

According to embodiments, the aerosol generating device 410 calculate the emotional state of the user and/or decide the recommended cartridge.

Figure 5:
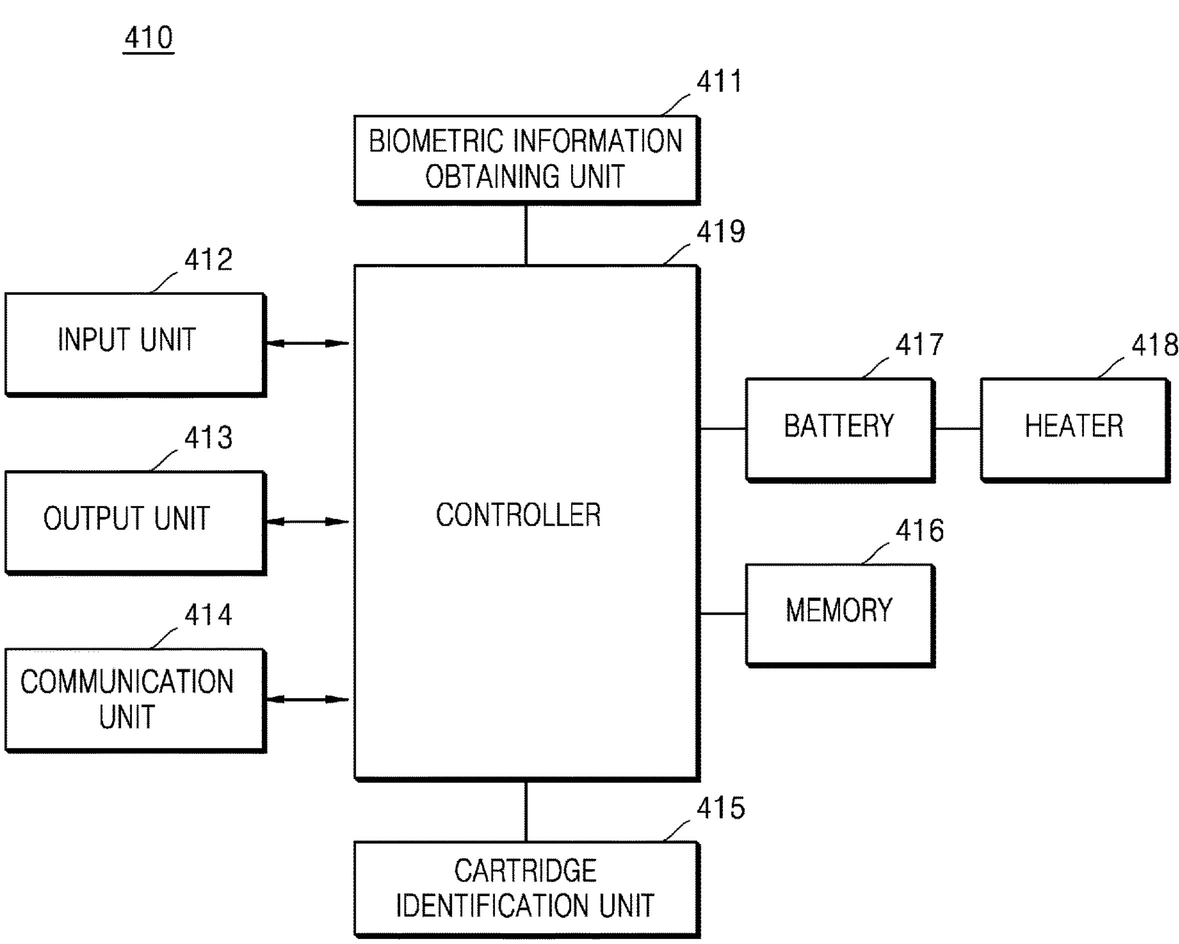
FIG. 5 is a block diagram of an inner portion of an aerosol generating device according to an embodiment.

FIG. 5 is an internal block diagram of the aerosol generating device according to embodiments of the present disclosure.

Referring to the drawing, the aerosol generating device 410 may include a biometric information obtaining unit 411, an input unit 412, an output unit 413, a communication unit 414, a cartridge identification unit 415, a memory 416, a battery 417, a heater 418, and a controller 419.

The biometric information obtaining unit 411 may obtain biometric information of the user. For example, the aerosol generating device 410 may obtain a pupil image of the user. The biometric information obtaining unit 411 may include a camera (e.g., an infrared (IR) camera) to obtain the image of the pupil of the user. In addition, the biometric information obtaining unit 411 may include a pupil tracking module configured to track pupil movements of the user.

The input unit 412 may be a user interface capable of receiving a user input. The input unit 412 may be provided in the form of a push button type or in a touch type.

The user may input a current emotional state through the input unit 412, and the input unit 412 may convert the current emotional state of the user to a preset signal and transmit the signal to the controller 419. For example, the emotional state of the user may be at least one of a negative emotional state such as anxiety, gloom, sadness, irritation, and anger, a positive emotional state such as amusement, happiness, and joy, and a neutral emotional state such as calmness.

The controller 419 may transmit, to the server 420 via the communication unit 414, the information about the emotional state of the user (hereinafter "emotional state input information") and a pupil image obtained by the biometric information obtaining unit 411 at a point when the emotional state is input by the user through the input unit 412.

For learning of the emotional calculation model, the controller 419 may provide the server 420 with the emotional state input information and the pupil image corresponding to the emotional state for a preset learning period. For example, the learning period may be set as thirty days but is not limited thereto. The learning period may increase or decrease depending on the number of times of input of the emotional state of the user.

In a case where the preset learning period is over, the communication unit 414 may transmit the pupil image of the user to the server, and may receive the information about the emotional state of the user and information about the recommended cartridge corresponding to the emotional state of the user. In this case, the information about the recommended cartridge may be calculated by the server 420 by using the neural-network-based emotion calculation model and the neural-network-based cartridge recommendation model.

In a case where the communication unit 414 receives the information about the emotional state of the user and the recommended cartridge, the output unit 413 may output the information about the recommended cartridge as visual and/or audio information. To do so, the output unit 413 may include a display and/or a speaker.

In addition, the output unit 413 may output a voice message corresponding to the emotional state of the user. For example, when an emotional state of the user is a negative emotional state, the output unit 413 may output a voice message such as "You're having a hard day." As another example, when an emotional state of the user is a positive emotional state, the output unit 413 may output a voice message such as "I wish all your days to be just like today". As another example, when an emotional state of the user is a neutral emotional state, the output unit 413 may output a voice message such as "I'm here for you today".

Meanwhile, as will be described later, an initial cartridge recommendation model is built based on academic papers, research data, journals, experimental results, patents, and the like, and accordingly, a cartridge capable of improving an emotional state of an actual user may be different from a cartridge that is recommended by the initial cartridge recommendation model. Accordingly, after the information about the recommended cartridge is output, the aerosol generating device 410 may identify a replacement cartridge that is newly installed in the aerosol generating device 410, and provide information about the cartridge to the server 420 so that the initial cartridge recommendation model may be trained and updated based on the information about the replacement cartridge.

In detail, the cartridge identification unit 415 may be provided in the main body and may identify the type of the cartridge that is coupled to the main body. According to an embodiment, when the main body and the cartridge are coupled to each other, the cartridge identification unit 415 may identify the cartridge coupled to the main body by measuring resistances at two ends of a contact terminal. According to another embodiment, when the main body and the cartridge are coupled to each other, the cartridge identification unit 415 may identify the cartridge coupled to the main body by measuring capacitance changes of the contact terminal. According to another embodiment, when the main body and the cartridge are coupled to each other, the cartridge identification unit 415 may identify the cartridge coupled to the main body by identifying an identification code (for example, a quick response (QR) code, a bar code, an optical sticker, and the like) attached to the cartridge.

After the output unit 413 outputs the information about the recommended cartridge, the cartridge identification unit 415 may convert information about the cartridge coupled to the main body to a preset signal and transmit the signal to the controller 419. To distinguish from the cartridge that is coupled to the main body before the information about the recommended cartridge is output, the cartridge that is coupled to the main body after the information about the recommended cartridge is output will be referred to as a replacement cartridge.

The controller 419 may transmit the information about the replacement cartridge, which is identified by the cartridge identification unit 415, to the server 420 via the communication unit 414. The server 420 updates the cartridge recommendation model based on the information about the replacement cartridge. As the number of times of update increases, a recommended cartridge may be better customized for the user.

The memory 416 may store information for operation of the aerosol generating device 410, the emotional state input information input by the user, the pupil image of the user obtained by the biometric information obtaining unit 411, information about the emotional state of the user, a voice message corresponding to the emotional state, and the like.

The battery 417 may provide power for operation of the aerosol generating device 410. The battery 417 shown in FIG. 5 may correspond to the battery 11 shown in FIGS. 1 through 3. For example, the battery 417 may provide power for the heater 418 to be heated and provide power for operation of the controller 419. In addition, the battery 417 may provide power for operation of a display, a sensor, a motor, and the like mounted in the aerosol generating device 410.

Figure 6:
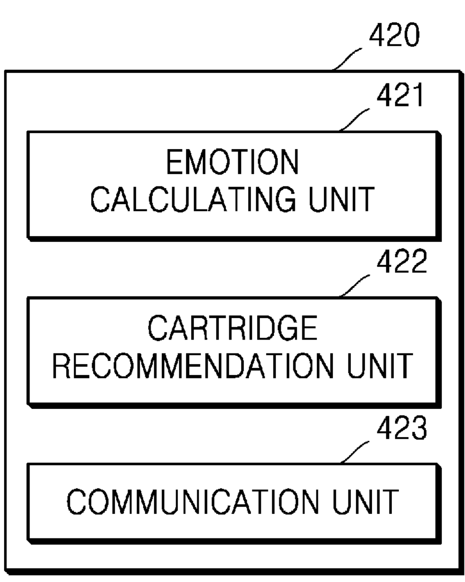
FIG. 6 is a block diagram of an inner portion of a server according to an embodiment.

FIG. 6 is a block diagram of the server according to the present disclosure.

Referring to FIG. 6, the server 420 may include an emotion calculating unit 421, a cartridge recommendation unit 422, and a communication unit 423. The server 420 may be operated by a manufacturer of the aerosol generating device 410 or by a company that is entrusted with services by the manufacturer.

The communication unit 423 may receive the emotional state input information and the pupil image transmitted from the aerosol generating device 410, and may transmit the information about a recommended cartridge to the aerosol generating device 410. In addition, the communication unit 423 may receive the information about the replacement cartridge transmitted from the aerosol generating device 410, and may transmit updated information about the recommended cartridge to the aerosol generating device 410. To do so, the communication unit 423 may include any one or any combination of a digital modem, a radio frequency (RF) modem, a WiFi chip, and related software and/or firmware.

The emotion calculating unit 421 may generate the emotion calculation model by machine learning based on the emotional state input information and the images of the pupil of the user that are collected during the preset learning period. The emotion calculation model may be a machine learning model configured to categorize different emotions of the user.

In detail, the emotion calculating unit 421 may extract feature data from the images of the pupil of the user. For example, the feature data may include at least one of pupil size data and pupil tremor data. In addition, the emotion calculating unit 421 may vectorize the feature data and generate an emotion calculation model based on one or more neural-network algorithms, such as Deep Neural network (DNN), Convolutional Neural Network (CNN), and Recurrent Neural Network (RNN), using the vectorized feature data as input.

The cartridge recommendation unit 422 may generate and store a cartridge recommendation model. The cartridge recommendation model may be a machine learning model configured to recommend a cartridge that is capable of adjusting the emotional states of the user.

In detail, the cartridge recommendation unit 422 may generate a cartridge recommendation model by using a supervised learning algorithm, based on academic papers, research data, journals, patents, and the like related to changes in the user's emotional state according to the component ratio of the liquid composition. For example, the supervised learning algorithm may include any one of k-Nearest Neighbors algorithm, Linear Regression algorithm, Logistic Regression algorithm, Support Vector Machine (SVM) algorithm, Decision Tree algorithm, and Random Forest algorithm.

The cartridge recommendation unit 422 may update the cartridge recommendation model based on the information about the replacement cartridge in order to recommend a user-customized cartridge. For example, the cartridge recommendation unit 422 may update the cartridge recommendation model by using a Bayesian optimization algorithm. As the number of times of updates of the cartridge recommendation model increases, the cartridge recommendation unit 422 may find a most suitable cartridge corresponding to an emotional state of the user.

Figure 7:
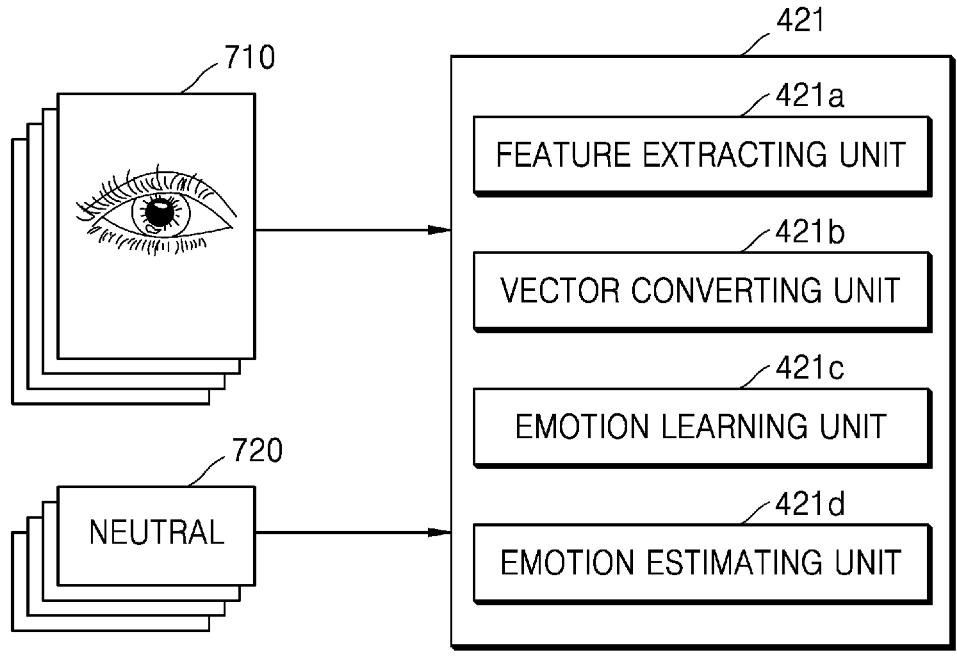
FIG. 7 is a diagram for describing a machine learning method and a method of calculating a user's emotional states performed by an emotion calculating model according to an embodiment.

FIG. 7 is a diagram for describing a machine learning method and a method of calculating an emotional state of the user performed by the emotion calculation model according to an embodiment.

Referring to FIG. 7, the emotion calculating unit 421 may include a feature extracting unit 421*a* configured to extract feature data from a pupil image 710 of the user, a vector converting unit 421*b* configured to vectorize the feature data, and an emotion learning unit 421*c* configured to generate an emotion calculation model by machine learning based on emotional state input information 720.

The feature extractor 421*a* may extract at least one of the pupil size data and pupil tremor data as feature data from the pupil image 710 received during the preset learning period.

The vector converter 421*b* may vectorize the feature data. For example, when the extracted feature data includes the pupil size data and the pupil tremor data, the vector converter 421*b* may generate two-dimensional column vectors of the pupil size data and the pupil tremor data.

During the preset learning period, the emotion learning unit 421*c* may generate the emotion calculation model based on the emotional state input information 720 and the vector-converted feature data (hereinafter, referred to as a feature vector).

The emotion learning unit 421*c* may machine-learn the emotion calculation model by using at least one neural-network algorithm of Deep Neural Network (DNN), Convolutional Neural Network (CNN), and a Recurrent Neural network (RNN), based on the emotional state input information 720 and a feature vector as input.

By the above-described learning process of the emotion calculation model, after the preset learning period, the emotion estimating unit 421*d* may calculate an emotional state of the user based on the emotion calculation model and the feature vector.

In detail, an emotion estimating unit 421*d* may set a feature vector corresponding to a neutral emotional state as a reference vector for calculating the user's emotion.

The emotion estimating unit 421*d* may normalize differences between the reference vector and the input feature vector by using a softmax function. The emotion estimating unit 421*d* may calculate the emotional state of the user based on the differences between the normalized reference vector and the feature vector.

According to an embodiment, the emotion estimating unit 421*d* may calculate the emotional state of the user based on a range of the differences between the normalized reference vector and the feature vector. For example, when the difference between the normalized reference vector and the feature vector is in the range of 0.2 to 0.5, the emotion estimating unit 421*d* may calculate the emotional state of the user as a negative emotional state. In addition, when the difference between the normalized reference vector and the feature vector is in the range of 0.6 to 0.9, the emotion estimating unit 421*d* may calculate the emotional state of the user as a positive emotional state.

In an embodiment, the emotion estimating unit 421*d* may assign an emotional state to each normalized value. For example, when a difference between the normalized reference vector and the feature vector is zero, the emotion estimating unit 421*d* may calculate an emotional state of the user as a calmness state. In addition, when a difference between the normalized reference vector and the feature vector is 0.3, the emotion estimating unit 421*d* may calculate an emotional state of the user as a gloom state. Also, when a difference between the normalized reference vector and the feature vector is 0.8, the emotion estimating unit 421*d* may calculate an emotional state of the user as a happy state.

Figure 8:
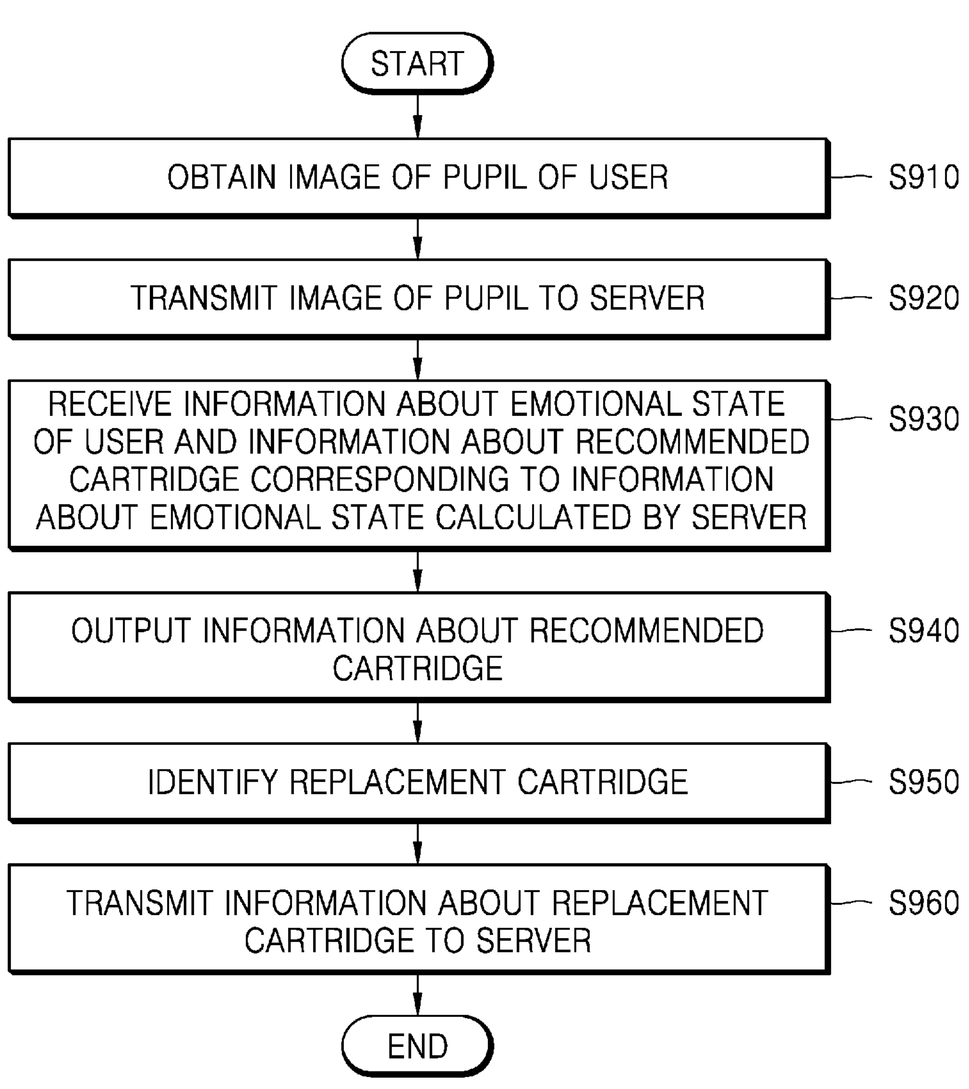
FIG. 8 is a flowchart for describing a method of operation of an aerosol generating device according to an embodiment.

FIG. 8 is a flowchart for describing a method of operating the aerosol generating device according to an embodiment.

Referring to FIG. 8, the biometric information obtaining unit 411 may obtain an image of a pupil of the user (S910). According to an embodiment, the biometric information obtaining unit 411 may obtain the image of the pupil of the user. To do so, for example, the biometric information obtaining unit 411 may include an IR camera.

The communication unit 414 may transmit the pupil image of the user to the server (S920).

In addition, the communication unit 414 may receive the information about the emotional state of the user and the information about the recommended cartridge corresponding to the emotional state from the server 420 (S930). Information about the emotional state of the user may be calculated by a neural-network-based emotion calculation model. In addition, the information about the recommended cartridge corresponding to the emotional state may be calculated by using a neural-network-based cartridge recommendation model.

The output unit 413 may output the information about the recommended cartridge (S940). The output unit 413 may output the information about the recommended cartridge as visual and/or audio information.

After the output unit 413 outputs the information about the recommended cartridge, the cartridge identification unit 415 may identify types of replacement cartridges coupled to the main body (S950). When the main body and the cartridge are coupled to each other, the cartridge identification unit 415 may identify a type of the replacement cartridge by using a change in resistance and/or capacitance at two ends of a contact terminal, an identification mark (for example, a QR code, a bar code, and an optical sticker, and the like) attached to the cartridge.

The communication unit 414 may transmit the information about the replacement cartridge to the server 420 (S960). The information about the replacement cartridge may be provided to the server 420, which updates a cartridge recommendation model.

Figure 9:
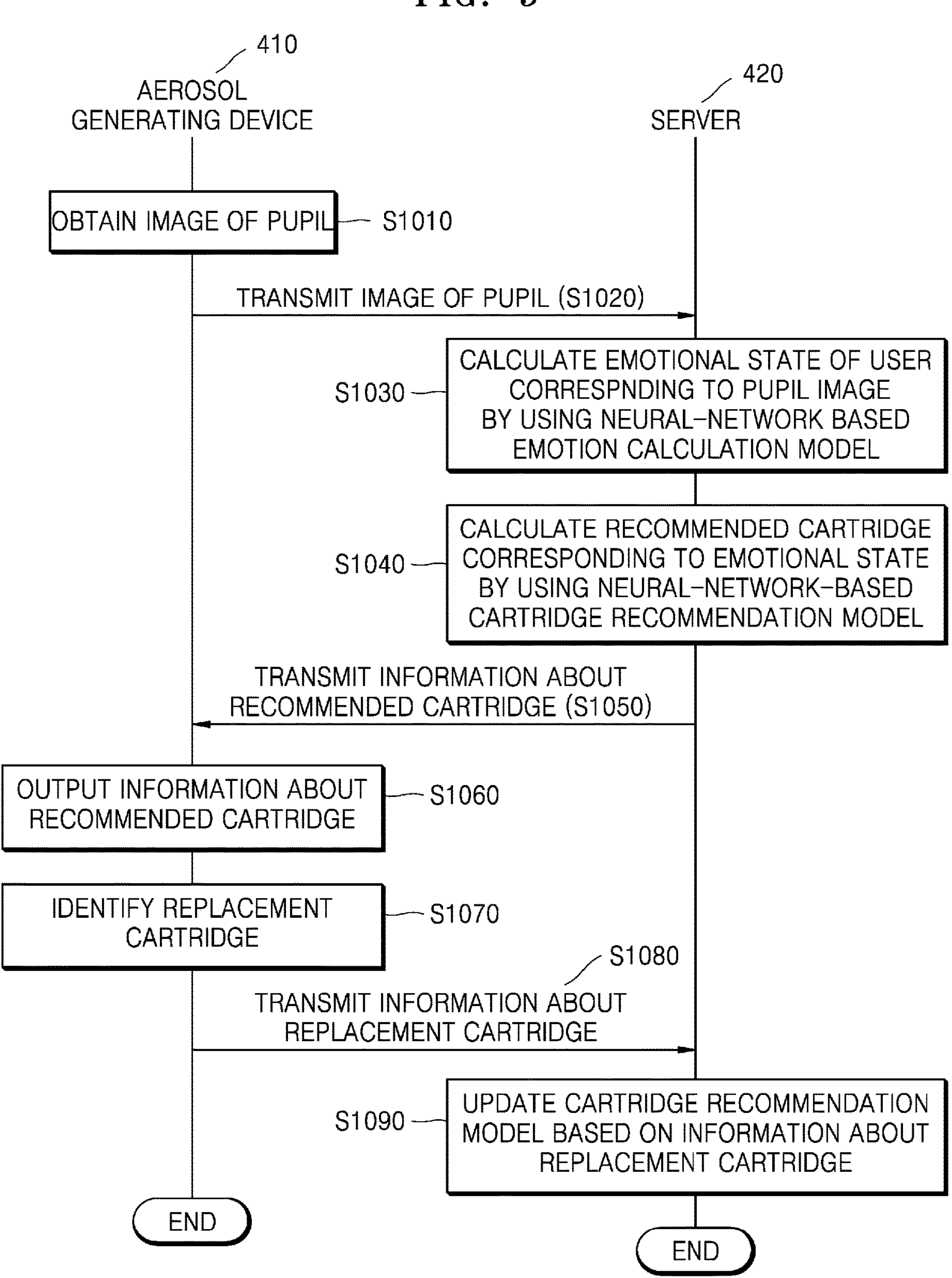
FIG. 9 is a signal flowchart of an aerosol generating device according to an embodiment.

FIG. 9 is a signal flowchart of the aerosol generating system according to an embodiment.

Referring to FIG. 9, the aerosol generating device 410 may obtain the image of the pupil of the user (S1010). In an embodiment, the aerosol generating device 410 may obtain the image of the pupil of the user by an IR camera.

The aerosol generating device 410 may transmit the image of the pupil of the user to the server 420 (S1020).

The server 420 may calculate the emotional state of the user corresponding to the image of the pupil of the user by using a neural-network-based emotion calculation model (S1030). The emotion calculation model may be a model generated by machine learning based on the emotional state input information and the images of the pupil of the user that are collected during the preset learning period.

The server 420 may calculate a recommended cartridge corresponding to the emotional state by using a neural-network-based cartridge recommendation model (S1040). The cartridge recommendation model may be generated based on a supervised learning algorithm, having academic papers, research data, journals, patents, and the like that are related to changes in the emotional states of the user according to the component ratios of the liquid components. For example, when an emotional state of the user is a gloom state, the cartridge recommendation model may recommend a cartridge including a vitamin D component. As another example, when an emotional state of the user is an irritation state, the cartridge recommendation model may recommend a cartridge including vitamin B and vitamin C. As another example, when an emotional state of the user is a happy state, the cartridge recommendation model may recommend a cartridge including a menthol component.

The server 420 may transmit the information about the recommended cartridge to the aerosol generating device 410 (S1050). According to an embodiment, the server 420 may also send information about the emotional state of the user to the aerosol generating device 410.

The aerosol generating device 410 may output the information about the recommended cartridge (S1060). The aerosol generating device may visually and/or audibly output the information about the recommended cartridge.

After outputting the information about the recommended cartridge, the aerosol generating device 410 may identify a type of a replacement cartridge that is coupled to the main body (S1070).

The aerosol generating device 410 may transmit the information about the replacement cartridge to the server 420 (S1080).

The server 420 may update the cartridge recommendation model based on the information about the replacement cartridge (S1090). For example, the server 420 may update the cartridge recommendation model by using a Bayesian optimization algorithm. As the number of times of updates of the cartridge recommendation model increases, the server 420 may calculate a recommended cartridge that better suits the emotional state of the user.

At least one of the components, elements, modules or units (collectively "components" in this paragraph) represented by a block in the drawings such as the controller 419, biometric information obtaining unit 411, cartridge identification unit 415, emotion calculating unit 421, cartridge recommendation unit 422, feature extracting unit 421*a*, vector converting unit 421*b*, emotion learning unit 421*c*, motion estimating unit 421*d* in FIGS. 5-7, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The above-described method may be written as a computer-executable program, and may be implemented in a general-purpose digital computer that operates the program by using a computer-readable recording medium. In addition, data structure used in the above-described method may be written on a computer-readable recording medium through various tools. The computer-recordable recording medium includes a storage medium such as a magnetic storage medium (for example, ROM, RAM, USB, floppy disk, hard disk, and the like), and an optical reading medium (for example, CD-ROM, DVD, and the like).

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is shown in the claims, not in the above description, and all differences within the scope equivalent thereto will be construed as being included in the present disclosure.

The invention claimed is:

1. An aerosol generating device comprising:
an output unit comprising a display or a speaker;
a camera; and
a controller comprising one or more processors,
wherein the controller is configured to:
obtain, using the camera, an image of a pupil of a user,
transmit the image of the pupil of the user, to a server,
receive information about a recommended cartridge corresponding to an emotional state of the user, from the server,
control the output unit to output the information about the recommended cartridge,
identify a type of a cartridge installed in the aerosol generating device based on an identification code attached to the cartridge or an electrical characteristic of the cartridge comprising at least one of a resistance value or a capacitance value, and
transmit information about a replacement cartridge, which is newly installed after the information about the recommended cartridge is output, to the server,
wherein the emotional state of the user is calculated by the server using a neural-network-based emotion calculation model based on the image, and the information about the recommended cartridge is calculated by the server using a neural-network-based cartridge recommendation model based on the emotional state of the user, and
wherein the cartridge recommendation model is updated based on the information about the replacement cartridge.

2. The aerosol generating device of claim 1, further comprising
a user interface configured to receive input information about the emotional state of the user,
wherein the controller is configured to, during a preset learning period, transmit the input information and the image of the pupil of the user to the server, and
wherein the image of the pupil of the user is obtained at a time point when the input information is received.

3. The aerosol generating device of claim 2, wherein the emotion calculation model is generated through machine learning based on the input information about the emotional state and images of the pupil collected during the preset learning period.

4. The aerosol generating device of claim 1, wherein the cartridge recommendation model is configured to recommend cartridges having different component ratios of liquid compositions based on the emotional state of the user.

5. The aerosol generating device of claim 1, wherein the cartridge recommendation model is updated based on a Bayesian optimization algorithm.

6. The aerosol generating device of claim 1, wherein
the controller is configured to receive information about the emotional state of the user from the server, and control the output unit to output an audio message corresponding to the information about the emotional state of the user.

7. An aerosol generating system comprising:
an aerosol generating device including a replaceable cartridge containing an aerosol generating material, and configured to obtain an image of a pupil of a user and output information about a recommended cartridge; and
a server configured to:
receive the image of the pupil of the user from the aerosol generating device;
calculate an emotional state of the user based on the image of the pupil of the user by using a neural-network-based emotion calculation model;
calculate the recommended cartridge based on the emotional state of the user by using a neural-network-based cartridge recommendation model; and
transmit information about the recommended cartridge to the aerosol generating device,
wherein the aerosol generating device is further configured to transmit information about a replacement cartridge, which is newly installed after the information about the recommended cartridge is output, to the server, and
wherein the server is configured to update the cartridge recommendation model based on the information about the replacement cartridge.

8. The aerosol generating system of claim 7, wherein
the aerosol generating device is configured to, during a preset learning period, transmit input information about the emotional state, which is received through a user interface of the aerosol generating device, and the image of the pupil of the user to the server, and the image of the pupil is obtained at a time point when the input information is received.

9. The aerosol generating system of claim 8, wherein the server is configured to generate the emotion calculation model through machine learning based on the input information about the emotional state and images of the pupil collected during the preset learning period.

10. The aerosol generating system of claim 7, wherein the cartridge recommendation model is configured to recommend cartridges having different component ratios of liquid compositions based on the emotional state of the user.

11. The aerosol generating system of claim 7, wherein the server is configured to update the cartridge recommendation model by using a Bayesian optimization algorithm.

* * * * *